(12) United States Patent
Sandhu et al.

(10) Patent No.: US 9,715,070 B2
(45) Date of Patent: Jul. 25, 2017

(54) APPARATUS PROVIDING SIMPLIFIED ALIGNMENT OF OPTICAL FIBER IN PHOTONIC INTEGRATED CIRCUITS

(71) Applicant: Micron Technology, Inc., Boise, ID (US)

(72) Inventors: Gurtej Sandhu, Boise, ID (US); Roy Meade, Boise, ID (US); Lei Bi, Boise, ID (US); John Smythe, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/362,578

(22) Filed: Nov. 28, 2016

(65) Prior Publication Data

US 2017/0139163 A1    May 18, 2017

Related U.S. Application Data

(60) Continuation of application No. 15/134,167, filed on Apr. 20, 2016, now Pat. No. 9,507,104, which is a division of application No. 13/732,557, filed on Jan. 2, 2013, now Pat. No. 9,341,787.

(51) Int. Cl.
   *G02B 6/30* (2006.01)
   *G02B 6/32* (2006.01)
   *G02B 6/42* (2006.01)

(52) U.S. Cl.
   CPC ........... *G02B 6/4226* (2013.01); *G02B 6/30* (2013.01); *G02B 6/32* (2013.01); *G02B 6/4206* (2013.01); *G02B 6/4225* (2013.01)

(58) Field of Classification Search
   CPC ........... G01C 19/5607; G01C 19/5621; G01C 19/5642; G01C 19/5712; G01C 19/5656; G02B 6/4226; G02B 6/32; G02B 6/3566; G02B 6/3578
   See application file for complete search history.

(56) References Cited

U.S. PATENT DOCUMENTS

| 4,385,373 A | * | 5/1983 | Howe | ................ | G02B 26/0875 |
|---|---|---|---|---|---|
| | | | | | 369/44.15 |
| 4,520,570 A | | 6/1985 | Bednorz et al. | | |
| 4,626,066 A | | 12/1986 | Levinson | | |
| 5,049,775 A | | 9/1991 | Smits | | |

(Continued)

FOREIGN PATENT DOCUMENTS

| JP | 57035814 A | 2/1982 |
|---|---|---|
| JP | 57035815 A | 2/1982 |

(Continued)

OTHER PUBLICATIONS

Notice of Rejection mailed Sep. 20, 2016 in corresponding Japanese Patent Application No. 2015-550496, 7 pages.

(Continued)

*Primary Examiner* — Ryan Lepisto
*Assistant Examiner* — Erin Chiem
(74) *Attorney, Agent, or Firm* — Perkins Coie LLP (57) ABSTRACT

A structure for optically aligning an optical fiber to a photonic device and method of fabrication of same. The structure optically aligns an optical fiber to the photonic device using a lens between the two which is moveable by actuator heads. The lens is moveable by respective motive sources associated with the actuator heads.

18 Claims, 6 Drawing Sheets

(56) References Cited

U.S. PATENT DOCUMENTS

| | | |
|---|---|---|
| 5,231,286 A | 7/1993 | Tomabechi et al. |
| 5,602,955 A | 2/1997 | Haake |
| 6,205,266 B1 | 3/2001 | Palen et al. |
| 6,587,612 B1 | 7/2003 | Mitchell et al. |
| 6,710,950 B2 | 3/2004 | Rouvinen et al. |
| 6,935,042 B2 | 8/2005 | Bonham et al. |
| 6,990,853 B2 | 1/2006 | Elrod et al. |
| 7,555,333 B2 | 6/2009 | Wang et al. |
| 7,558,168 B2 | 7/2009 | Chen et al. |
| 9,507,104 B2 | 11/2016 | Smythe et al. |
| 2001/0026660 A1 | 10/2001 | Asakura et al. |
| 2003/0227560 A1 | 12/2003 | Mattsson et al. |
| 2007/0114890 A1 | 5/2007 | Churchill et al. |
| 2007/0263963 A1 | 11/2007 | Hughes et al. |
| 2011/0013869 A1* | 1/2011 | Pezeshki .............. G02B 6/32 385/33 |
| 2011/0181150 A1 | 7/2011 | Mahameed et al. |
| 2011/0317972 A1* | 12/2011 | Zhang .............. G02B 6/4221 385/135 |
| 2014/0185983 A1 | 7/2014 | Sandhu et al. |

FOREIGN PATENT DOCUMENTS

| | | |
|---|---|---|
| JP | 07043548 A | 2/1995 |
| JP | 2000111816 A | 4/2000 |
| JP | 2001083372 A | 3/2001 |
| JP | 2001337247 A | 12/2001 |
| JP | 2004286966 A | 10/2004 |
| NL | 2000876 C2 | 3/2009 |
| TW | 200532267 A | 10/2005 |
| TW | 200942878 A | 10/2009 |

OTHER PUBLICATIONS

Office Action mailed Sep. 24, 2015 in Taiwan Application No. 102149302, 4 pages.

Zhang, Qingxin et al., "A Silicon Platform with MEMS Active Alignment Function and Its Potential Application in Si-Photonics Packaging", IEEE Journal of Selected Topics in Quantum Electronics, vol. 16, No. 1, Jan. 2010.

Office Action mailed Oct. 11, 2016 in corresponding Chinese Patent Application No. 201380069230.7.

* cited by examiner

APPARATUS PROVIDING SIMPLIFIED ALIGNMENT OF OPTICAL FIBER IN PHOTONIC INTEGRATED CIRCUITS

CROSS-REFERENCE TO RELATED APPLICATION(S)

This application is a continuation of U.S. patent application Ser. No. 15/134,167 filed Apr. 20, 2016, now U.S. Pat. No. 9,507,104, which is a divisional of U.S. application Ser. No. 13/732,557 filed Jan. 2, 2013, now U.S. Pat. No. 9,341,787, which is incorporated herein by reference in its entirety.

STATEMENT REGARDING FEDERALLY SPONSORED RESEARCH

This invention was made with Government support under Contract Number 9999404-12-0004 awarded by DARPA. The Government has certain rights in the invention.

TECHNICAL FIELD

Embodiments of the invention provide alignment structures for optically aligning an optical fiber to a photonic device in photonic integrated circuits.

BACKGROUND

Optical signal transmission may be used to communicate signals between separated integrated circuit chips to provide inter-chip connections and within components on the same integrated circuit chip to provide inter-chip connections. In many instances it is necessary to couple an external optical fiber to a photonic device, e.g., a waveguide, of an integrated circuit photonics chip. Such coupling requires precise optical alignment between the optical fiber and the photonic device.

In order to achieve such precise optical alignment, there have been proposed complex microelectromechanical systems (MEMS) which are built on an integrated circuit chip for optically aligning an optical fiber and photonic device. Complex MEMS structures, however, are expensive to implement and time-consuming to fabricate. In addition, a structure for aligning an optical fiber to a photonic device should account for alignment changes which may occur during use, for example, due to temperature changes or other perturbating influences which may occur. What is needed is a simple structure for optically aligning and maintaining optical alignment of an optical fiber to a photonic device on an integrated circuit chip.

DETAILED DESCRIPTION

Embodiments described herein provide a simplified structure for optically aligning an optical fiber with a photonic device, the latter being provided on an integrated circuit photonics chip which contains optical devices for propagating and processing light signals. The structure can be fabricated using known MEMS techniques on a semiconductor, e.g., silicon, substrate of an integrated circuit photonics chip. An alignment lens is provided between the optical fiber and photonic device. The lens is moveable in three directions (x, y and z) to produce and maintain optical alignment of the optical fiber and photonic device. A pair of lower actuator heads hold the lens from below and are respectively provided at the free ends of a pair of cantilever arms. Another upper actuator head is provided at the free end of another cantilever arm and holds the lens from above and in place on the lower pair of actuator heads. A respective motive source, e.g., a piezoelectric structure, is associated with each of the cantilever arms. The motive source is arranged to bend the arms to move the respective actuator heads and thus the lens in the three directions to acquire and maintain optical alignment between the optical fiber and photonic device. Alternatively, the cantilever arms connected to the lower actuators can be non-bendable, or another fixed structure can be used, to support the lower actuator heads with a respective motive source provided between the lower actuator heads and fixed structure to affect their movement. In another alternative, motive sources can also be provided between the lens and fixed actuator heads. A control loop can be used to acquire a received optical signal and establish and maintain optical alignment by appropriately activating the motive sources in response to the received optical signal to move the actuator heads and hold the lens in a position which optically aligns the optical fiber and photonic device.

Figure 1:
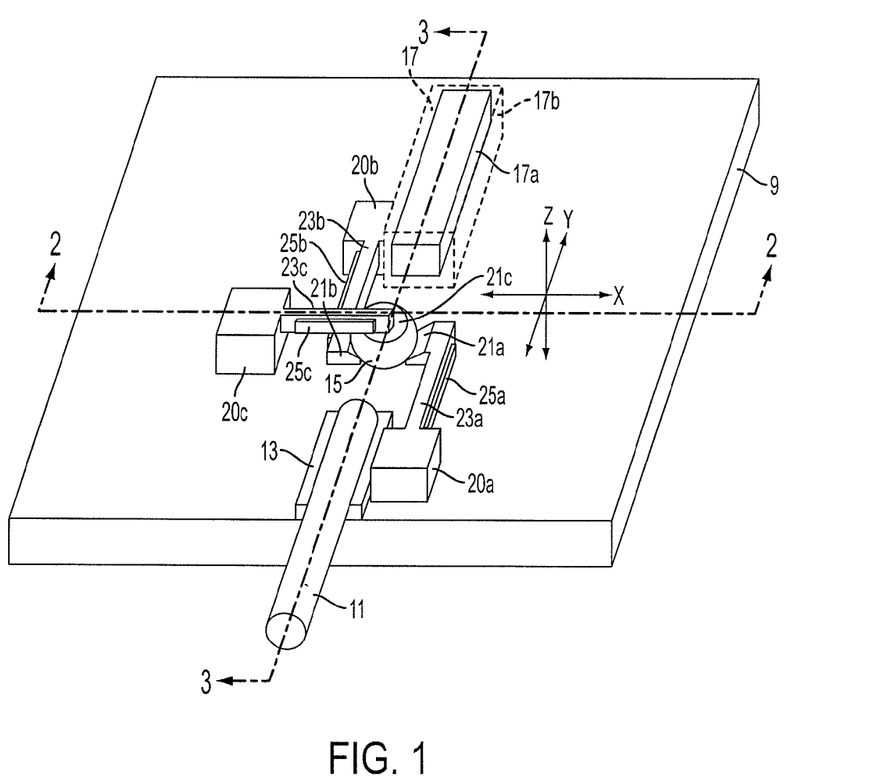
FIG. 1 is a perspective view of an embodiment of an optical alignment structure.
Figure 2:
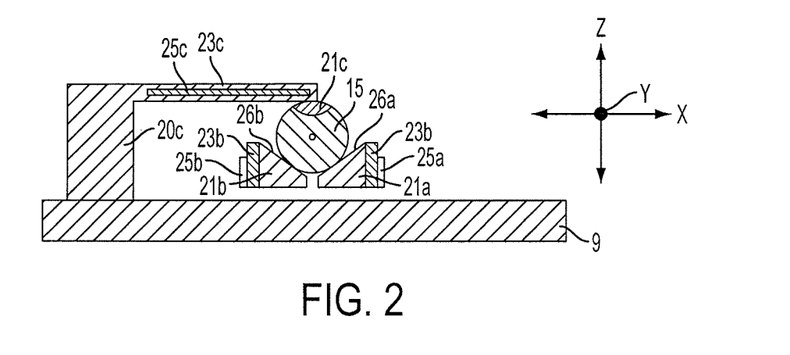
FIG. 2 is a cross-sectional view showing greater detail of a portion of the FIG. 1 embodiment.
Figure 3:
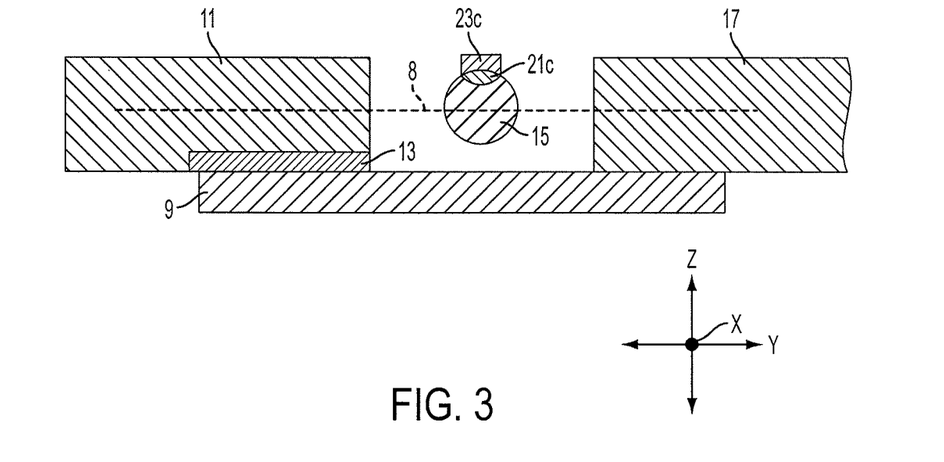
FIG. 3 is another cross-sectional view showing greater detail of a portion of the FIG. 1 embodiment.

Referring now to the drawings, FIG. 1 shows a perspective view of an embodiment of the invention, while FIGS. 2 and 3 show in cross-section details of elements of the FIG. 1 embodiment. An integrated circuit photonics chip 9 formed of a semiconductor, e.g., silicon, substrate which includes photonic devices, and which may also include electrical devices and circuits on the same chip, is shown. The chip 9 includes a fabricated waveguide 17, having a waveguide core 17a and associated cladding 17b. The waveguide 17 receives or transmits an optical signal from or to an optical fiber 11 which is adhered by an adhesive at one end to a cradle 13 fabricated on the integrated circuit chip 9 and which has a curved upper surface which accepts the curved outer surface of optical fiber 11. Optical signals transmitted between the optical fiber 11 and waveguide 17 pass through a lens 15.

Figure 4:
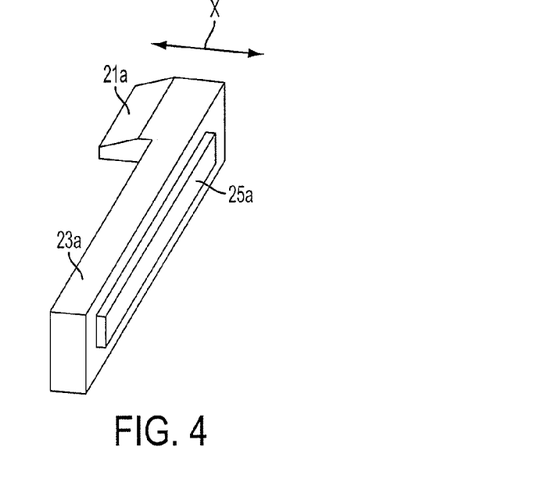
FIG. 4 is an enlargement of a portion of FIG. 1.

The lens 15 may take various forms, including but not limited to, a ball lens, a barrel lens and a spherical lens. In the following discussion a ball lens is discussed as an example of lens 15. The lens 15 is adjustably held in the optical path between the optical fiber 11 and waveguide 17 by lower actuator heads 21a, 21b which have downwardly inclined faces 26a, 26b (FIG. 2) which engage with a lower surface of lens 15. The lower actuator heads 21a, 21b are provided at the free ends of respective cantilever arms 23a, 23b. The support ends of the cantilever arms 23a, 23b are integrally connected to respective bases 20a, 20b which are fabricated on integrated circuit chip 9. The cantilever arms 23a, 23b are independently bendable in the x axis direction as shown in FIGS. 2 and 4, by virtue of respective motive sources which may take the form of respective independent piezoelectric structures 25a, 25b provided along the length of each of the cantilever arms 23a, 23b. The piezoelectric structures 251, 25b may take the form of a known biomorphic structure which includes a first layer of silicon and a second layer of piezoelectric material such as PZT or PMN. The independent bending of the cantilever arms 23a, 23b causes independent movement of the actuator heads 21a, 21b in the x axis direction in accordance with voltages applied to the piezoelectric structures 25a, 25b.

The lens 15 is also held at its upper surface by an upper actuator 21c which may be in the form of a cap or other structure for engaging with a portion of the upper surface of lens 15. The upper actuator 21c is provided at the free end of a cantilever arm 23c. A motive source is provided along the side of cantilever arm 23c and can be in the form of a piezoelectric structure 25c. The piezoelectric structure 25c causes bending of cantilever arm 23c and thus movement of the lens 15 in the y axis direction, as shown in FIGS. 1 and 3. As described in detail below, the independent movement of the cantilever arms 23a, 23b and 23c by the corresponding piezoelectric structures 25a, 25b, and 25c enables the lens 15 to be moved in the x, y, and z axis directions shown in FIGS. 1-4.

FIG. 2 shows a cross-sectional view along the lines 2-2 of FIG. 1. The FIG. 2 cross-section is through the lens 15 and lower actuator heads 21a, 21b. FIG. 3 shows a cross-sectional view through the optical fiber 11, lens 15 and waveguide 17 along lines 3-3 of FIG. 1. As shown in FIG. 2, each lower actuator head 21a, 21b has a sloped face 26a, 26b on which lens 15 rests. FIG. 2 shows the lower actuator heads 21a, 21b as having a planar downwardly sloping face 26a, 26b; however, as described below, other profiles can be used for the faces of the actuator heads 21a, 21b.

Figure 5A:
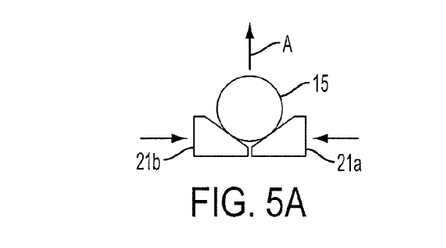
FIGS. 5A through 5F show in cross-sectional view operational movements of actuator heads depicted in FIG. 1.
Figure 5B:
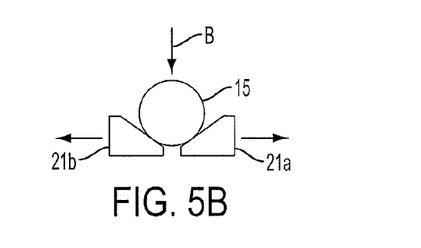
Figure 5C:
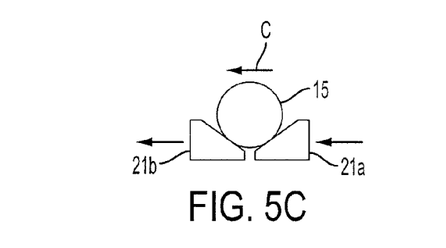
Figure 5D:
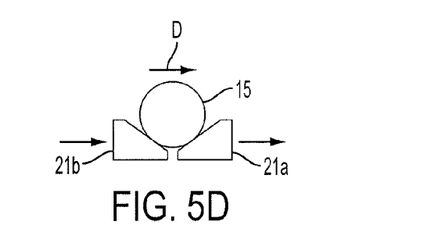
Figure 5E:
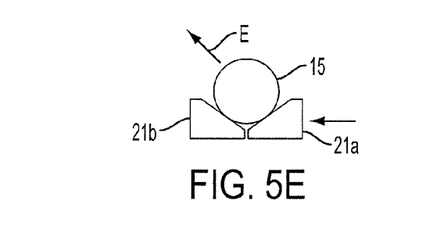
Figure 5F:
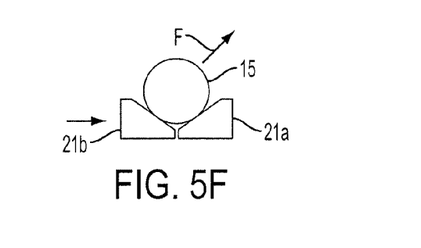

FIGS. 5A-5F show how lens 15 is moveable in the x axis and z axis directions in accordance with movement of the lower actuator heads 21a, 21b upon actuation by respective piezoelectric structures 25a, 25b. To accommodate the z axis movement, cantilever arm 23c, which holds actuator head 21c on the top of lens 15, is bendable up and down. FIG. 5A shows by arrow A lens 15 moving upwardly when the piezoelectric structures 25a, 25b are each activated to bend respective cantilever arms 23a, 23b and move both actuator heads 21a, 21b towards one another, while FIG. 5B shows by arrow B lens 15 moving downwardly when the piezoelectric structures 25a, 25b are each activated to bend respective cantilever arms 23a, 23b and move both the actuator heads 21a, 21b away from one another. FIGS. 5C and 5D show by respective arrows C and D movement of lens 15 to the left and right respectively when the piezoelectric structures 25a, 25b are each activated to bend respective cantilever arms 23a, 23b and move both actuator heads 21a, 21b to the left and to the right. FIG. 5E shows by arrow E a leftward upward movement of lens 15 when actuator 21b is not operated by piezoelectric structure 25b, and actuator 21a is moved to the left by operation of piezoelectric structure 25a and the bending of cantilever arm 23a. FIG. 5F shows by arrow F movement of lens 15 when piezoelectric structure 25b bends cantilever arm 23b to move actuator head 21b to the right while actuator head 21a remains stationary.

As noted, cantilever arm 23c is bendable in the z axis direction as actuator 21c moves up and down in response to movement of the lens 15 by the actuator heads 21a. 21b. In addition, the piezoelectric structure 25c associated with cantilever arm 23c causes arm 23c to bend in the y axis direction to move actuator 21c and lens 15 along the y axis. As a result, lens 15 is moveable along all three axes x, y and z.

Figure 6:
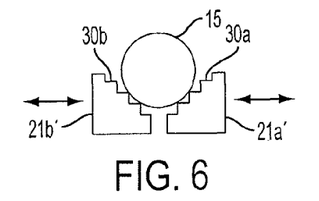
FIG. 6 is a cross-sectional view of another embodiment.
Figure 7:
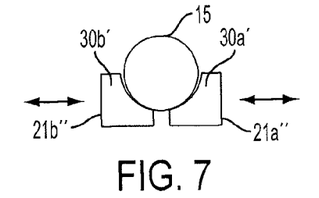
FIG. 7 is a cross-sectional view of another embodiment.

FIG. 6 shows in cross section modified lower actuator heads 21a' and 21b', each provided with respective downwardly inclined stepped surfaces 30a, 30b for contacting lens 15. The stepped surfaces 30b, 30a provide a stepped incremental adjustment of lens 15 when moving in the directions indicted by FIGS. 5A, 5B, 5E and 5F. FIG. 7 shows other modified lower actuator heads 21a" and 21b" which have respective curved actuator surfaces 30a' and 30b'.

Figure 8:
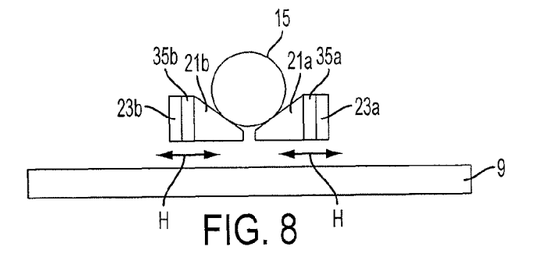
FIG. 8 is a cross-sectional view of another embodiment.
Figure 9:
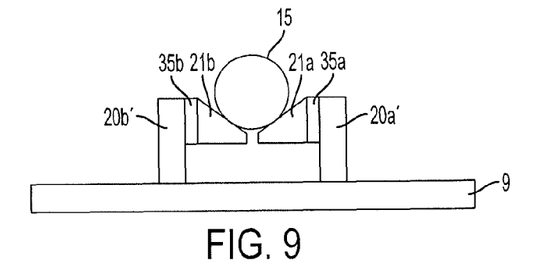
FIG. 9 is a cross-sectional view of another embodiment.
Figure 10:
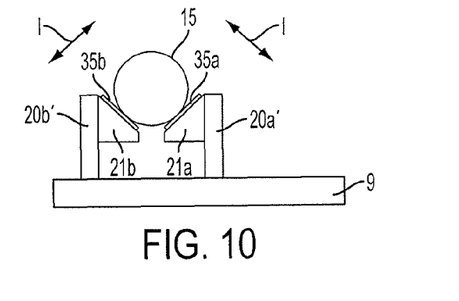
FIG. 10 is a cross-sectional view of another embodiment.

Movement of the actuator heads 21a, 21b, 21c in the embodiments described above occurs by appropriate electrical actuation of respective piezoelectric structures 25a, 25b, 25c which bend respective cantilever arms 23a, 23b, 23c. In another embodiment, the cantilever arms 23a, 23b for lower activator heads 21a, 21b can be non-bendable and piezoelectric structures 25a, 25b omitted from the cantilever arms 23a, 23b. Instead, as shown in FIG. 8, piezoelectric structures 35a, 35b can be located between respective non-bendable cantilever arms 23a, 23b and their associated actuator heads 21a, 21b. In this arrangement, the piezoelectric structures 35a, 35b are each independently operated to expand and compress as shown by arrows H thereby moving the respective actuator heads 21a and 21b to position lens 15 in the manner shown in FIGS. 5A-5F. In another alternative embodiment, as shown in FIG. 9, the cantilever arms 23a, 23b can be omitted and the piezoelectric structures 35a, 35b attached directly to support bases 20a' and 20b' fabricated on the chip 9. In yet another embodiment shown in FIG. 10, the piezoelectric structures 35a, 35b can be formed directly on the surfaces of the lower actuator heads 21a, 21b where they directly engage with the lens 15 and compress or contact in the directions of arrows Ito move lens 15.

Figure 11:
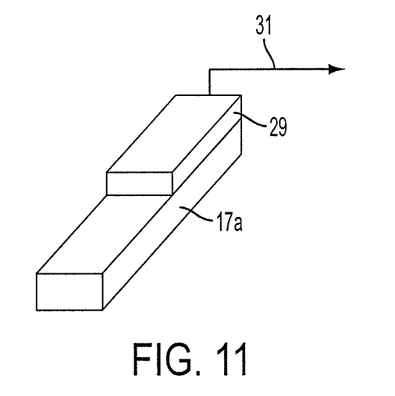
FIG. 11 is a perspective view of a signal detector.
Figure 12:
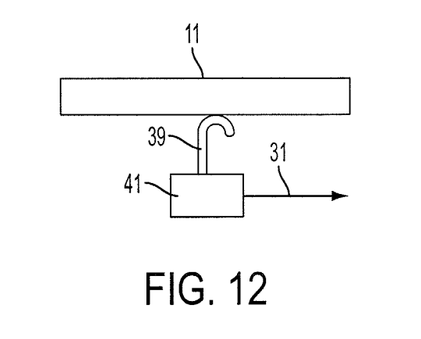
FIG. 12 is a top view of another signal detector.

In order to operate the piezoelectric structure 25a, 25b, 25c or 35a, 35b, 25c an alignment control system is provided which samples and monitors the strength of a received optical signal to control the position of lens 15. FIG. 11 illustrates a signal detector 29 fabricated on waveguide core 17a which can be formed of germanium or germanium-silicon and which receives an optical signal from waveguide core 17a corresponding to an optical signal transmitting to waveguide 17 from optical fiber 11. Signal detector 29 outputs an electrical signal 31 corresponding to the received optical signal. FIG. 12 illustrates a signal detector 41 which can also be formed of germanium or germanium silicon which can be coupled to an optical fiber 11 receiving an optical signal from a waveguide 17. Signal detector 41 is evanescently coupled to optical fiber 11 by a waveguide 39 and can also provide an output signal 31. Detectors 29 and 41 can provide output signals representing the strength of a received optical signal which can be used by a control system to control the position of lens 15.

Figure 13:
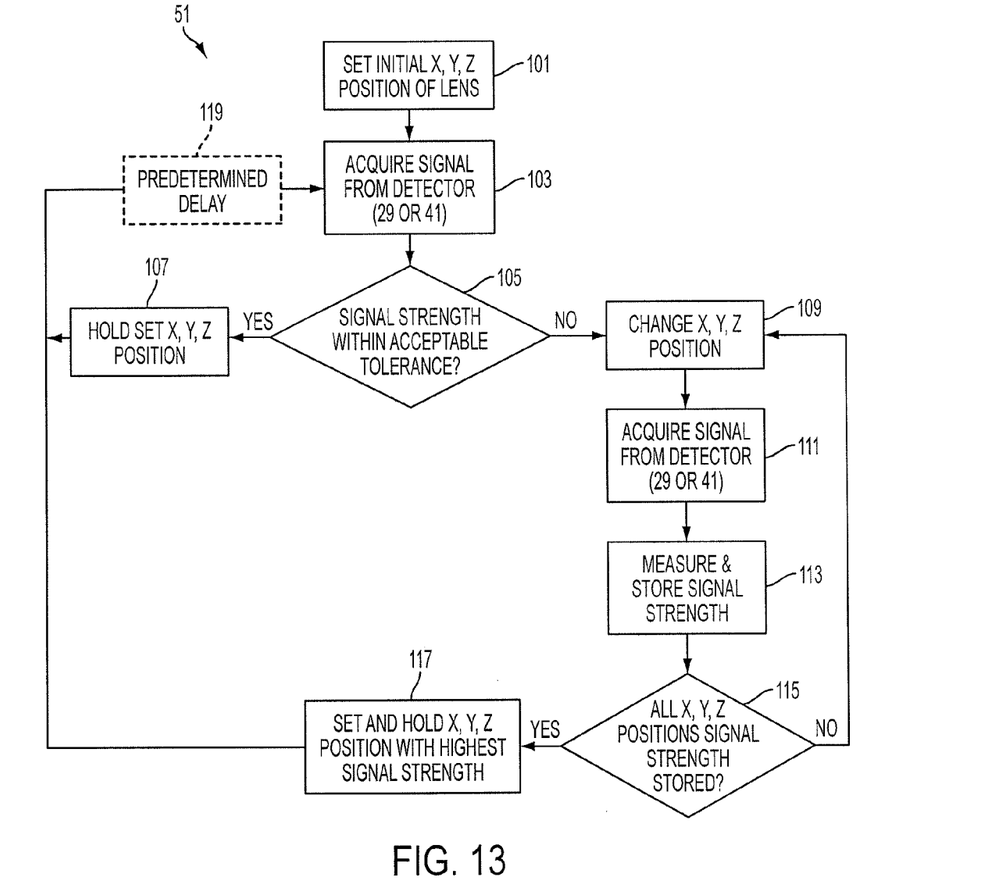
FIG. 13 illustrates a control system which can be used to dynamically optically align an optical fiber with a photonic device.

FIG. 13 illustrates one example of a control system 51 which receives the signal strength output signals from either detector 29 or detector 41 and which provides actuating signals for piezoelectric structures 25a, 25b, 25c (or 35a, 35b, and 25c). The control system 51 can be implemented as a hardware circuit structure integrated on integrated circuit chip 9 or as software running on a processor structure integrated on chip integrated circuit 9, or as a combination of the two. For simplification, the control system 51 will be described as the operational steps which are executed by the circuit structure, programmed processor structure, or combination of the two.

In step 101, an initial central x axis, y axis, and z axis position of lens 15 is set and the piezoelectric structures (25a, 25b, 25c or 35a, 35b, 25c) are actuated to obtain this central lens 15 position. At step 103 an optical signal strength is acquired from either detector 29 or 41, depending on whether waveguide 17 is receiving an optical signal from optical fiber 11 or vice versa. In step 105 the signal strength of the received optical signal is compared with a reference signal strength to see if it is within an acceptable tolerance range, e.g., above a pre-set amplitude level. If the answer is yes, the current x, y, z position of lens 15 is held by maintaining the current actuation state of the piezoelectric structures 25a, 25b, 25c or 35a, 35b, 25c at step 107. The operational flow then returns to step 103, with or without a predetermined delay 119, where another signal is acquired from either detector 29 or 41. A predetermined delay, shown as an option by the dotted step 119, will cause a periodic rather than a continuous acquisition of a signal from the detector 29 or 41 after an x, y, z position is set for lens 15.

If the signal strength acquired from the detector 29 or 41 is not within an acceptable tolerance range, as determined in step 105, control system 51 actuates the piezoelectric structures 25a, 25b, 25c (or 35a, 35b, 25c) to change the x, y and z lens position by setting a new x, y, z lens 15 position in step 109. A signal is then acquired in step 111 from either detector 29 or 41, and a signal strength at that new x, y, z lens position is measured and stored in step 113. In step 115 a determination is made if all possible x, y, z positions of lens 15 have been set and corresponding signal strength values stored. If the answer is yes, the x, y, z position having the highest stored signal strength is set as the position of lens 15 and the piezoelectric structures 25a, 25b, 25c (or 35a, 35b, 25c) correspondingly actuated in step 117 to set the lens 15 at that position. Following step 117, the control system 51 reverts back to step 103, with or without the predetermined delay 119.

If in step 115 not all x, y, z positions have been set for lens 15 and corresponding signal strengths stored, the control system 51 returns to step 109 and the operation implemented by steps 109-115 repeats until a yes condition is detected in step 115.

Thus, control system 51 starts from an initial central x, y, z lens 15 position and if the signal strength, which can be checked periodically or continuously, is not within an acceptable tolerance range as detected at step 105, it finds a new x, y, z position for lens 15 where signal strength is a maximum and sets that as the new x, y, z lens 15 position. The control system 51 operates dynamically to periodically or continuously shift lens 15, if adjustment is needed, to set it at the best position to optionally align the optical fiber 11 and waveguide 17. It should be noted that FIG. 13 represents but one example of a control process which can be implemented by control system 51 and used to adjust lens 15 to a position which best aligns optical signals between optical fiber 11 and a waveguide 17. Other control processes 51 can also be used.

The structures illustrated herein are fabricated on integrated circuit photonics chip 9 using known MEMS techniques which fabricate and shape structures from the substrate material of the chip 9.

While example embodiments have been described in detail, it should be readily understood that the invention is not limited to the disclosed embodiments. Rather the embodiments can be modified to incorporate any number of variations, alterations, substitutions, or equivalent arrangements not heretofore described without departing from the scope of the invention which is defined solely by the scope of the appended claims.

We claim:

1. A method aligning an optical fiber with a photonic device, the method comprising:
    disposing an alignment lens between an optical fiber and a photonic device, wherein the alignment lens is coupled to three cantilever arms, each containing a respective actuator head at a free end and each associated with a respective motive source associated for causing movement of the lens; and
    activating the respective motive sources to move one or more of the cantilever arms to cause movement of the lens to a position in which the optical fiber is optically aligned with the photonic device.

2. A method as in claim 1, wherein the motive source comprises a respective piezoelectric structure for causing movement of a respective actuator head.

3. A method as in claim 2, wherein activating the piezoelectric structure causes a bending movement of a respective cantilever arm to move a respective actuator head.

4. A method as in claim 3, wherein each piezoelectric structure is provided on a respective cantilever arm.

5. A method as in claim 1, wherein two of the actuator heads support opposite sides of the lens from below and are provided with a downwardly sloping inclined area for engaging with the lens.

6. A method as in claim 5, wherein the inclined area comprises a planar area.

7. A method as in claim 5, wherein the inclined area comprises a curved area.

8. A method as in claim 5, wherein the inclined area comprises a series of steps.

9. A method as in claim 1, further comprising:
    detecting light received by at least one of the photonic device and the optical fiber; and
    based on the detected light, activating one or more of the motive sources to improve the optical alignment of the optical fiber and the photonic device.

10. A method aligning an optical fiber with a photonic device, the method comprising:
    providing an optical fiber;
    providing a photonic device;
    disposing an alignment lens between the optical fiber and a photonic device;
    disposing three actuator heads adjacent to the alignment lens, each actuator head being positioned at a free end of a respective cantilever arm that is movable by a respective motive source; and
    activating one or more of the motive sources to move the lens to a position in which the optical fiber is optically aligned with the photonic device.

11. A method as in claim 10, wherein the motive sources comprise respective piezoelectric structures for causing movement of respective actuator heads.

12. A method as in claim 11, wherein activating the piezoelectric structure causes a bending movement of a respective cantilever arm to move a respective actuator head.

13. A method as in claim 12, wherein each piezoelectric structure is provided on a respective cantilever arm.

14. A method as in claim 10, wherein two of the actuator heads support opposite sides of the lens from below and are provided with a downwardly sloping inclined area for engaging with the lens.

15. A method as in claim 14, wherein the inclined area comprises a planar area.

16. A method as in claim 14, wherein the inclined area comprises a curved area.

17. A method as in claim 14, wherein the inclined area comprises a series of steps.

18. A method as in claim 10, further comprising:
   detecting light received by at least one of the photonic device and the optical fiber; and
   based on the detected light, activating one or more of the motive sources to improve the optical alignment of the optical fiber and the photonic device.

\* \* \* \* \*